United States Patent [19]
Harrison et al.

[11] Patent Number: 5,769,258
[45] Date of Patent: Jun. 23, 1998

[54] PRESSURE VESSELS

[75] Inventors: Ronald Arthur Harrison, North Plymouth; Angus George Peacock, Kent, both of Great Britain

[73] Assignee: Pewter (No. 2) Limited, London, England

[21] Appl. No.: 510,417

[22] Filed: Aug. 2, 1995

[30] Foreign Application Priority Data

Aug. 3, 1994 [EP] European Pat. Off. .............. 94305775

[51] Int. Cl.⁶ .................................................. B65D 51/16
[52] U.S. Cl. ................................. 220/203.1; 220/203.12; 220/367.1; 220/89.1
[58] Field of Search .......................... 220/203.09, 203.1, 220/203.12, 366, 1, 367.1, 89.1

[56] References Cited

U.S. PATENT DOCUMENTS

| | | | |
|---|---|---|---|
| 1,707,439 | 4/1929 | Kivlan . | |
| 2,268,720 | 1/1942 | Onthank . | |
| 2,279,666 | 4/1942 | Etnyre | 220/203.1 |
| 2,288,230 | 6/1942 | Drane | 220/203.1 |
| 2,288,312 | 6/1942 | Brown | 220/203.1 |
| 2,974,823 | 3/1961 | Levin | 220/203.091 |
| 3,387,738 | 6/1968 | Kemp . | |
| 5,072,851 | 12/1991 | Wilkes | 220/366 |
| 5,085,337 | 2/1992 | Kos | 220/204 |
| 5,121,852 | 6/1992 | Wilkes | 220/366 |

FOREIGN PATENT DOCUMENTS

| | | |
|---|---|---|
| 3027091 | 2/1982 | Germany . |
| 8906049 | 8/1989 | Germany . |

Primary Examiner—Stephen Cronin
Attorney, Agent, or Firm—Pillsbury Madison & Sutro LLP

[57] ABSTRACT

Disclosed is a closure means for a pressure vessel, said pressure vessel comprising a body portion and a lid portion, the closure means comprising: securing means attached to the lid portion for releasably securing the body and lid portions together to form a subtantially gastight enclosure, the securing means permitting a limited degree of movement between the body and lid portions from a sealing position to a venting position when the pressure within the vessel exceeds the external pressure by a predetermined amount thereby permitting venting of excess pressure, the closure means comprising biasing means acting to bias movement of the body and lid portions from the venting position to the sealing position after venting of excess pressure, and pressure vessels comprising said closure means.

12 Claims, 6 Drawing Sheets

Fig. 8

PRESSURE VESSELS

FIELD OF THE INVENTION

This invention relates to an improved closure means for use with pressure vessels. As used herein, the term "pressure vessel" is intended to refer to any vessel which during normal usage may be subjected, at some time, to an internal pressure different to the external pressure. Generally the external pressure will be atmospheric pressure and typically the internal pressure will be greater than the external pressure. Examples of pressure vessels include pressure cookers, autoclaves and anaerobic jars. The invention concerns particularly closure means for use with pressure vessels, and pressure vessels comprising the closure means.

BACKGROUND TO THE INVENTION

Anaerobic jars are well known to those skilled in the art. Conventional anaerobic jars comprise a body portion and a lid portion. The lid portion forms an gas-tight seal with the body portion, typically being held in place by a screw-clamp mechanism. Petri dishes inoculated with micro-organisms are stacked within the container, together with a gas generation system. The gas generation system is activated (e.g. by exposure to air or water) and the lid is sealed. The gas generation system typically absorbs oxygen and releases a certain volume of a different gas, such as carbon dioxide. In this way, substantially anaerobic conditions can be created within the anaerobic jar, which conditions may be preferable, or even essential, for the growth of certain micro-organisms.

However, if the gas generation system releases a greater volume of gas than the volume of oxygen absorbed, then there may be an increase in pressure inside the anaerobic jar. Alternatively, an increased internal pressure may be caused by gas generation during the growth of particular micro-organisms. An elevated pressure within the anaerobic jar represents a potential safety hazard.

It is known to provide pressure-sensitive closure means for use on containers used in the canning and preserving of foodstuffs. For example U.S. Pat. No. 1,707,439 discloses the use of spring clips associated directly with the body portion of a container (or indirectly associated by means of a wire running around the circumference of the body portion). The spring clips are "adapted to yield and permit the escape of gases and vapours from the container when the pressure therein exceeds a predetermined limit". The spring clips permit relative movement of the lid and body portions to allow venting of gases and vapours and re-seat the lid and body portions when the excess pressure is removed. A substantially similar device is taught in U.S. Pat. No. 2,268,720.

A number of shortcomings are associated with these devices. For example, the container is designed to vent at a pre-determined pressure difference, such that use of the container to perform different functions (in which different pressures might be encountered) is not feasible. Further, the spring clips taught by the prior art are prone to damage and accidental release.

SUMMARY OF THE INVENTION

In a first aspect the invention provides closure means for a pressure vessel, said pressure vessel comprising a body portion and a lid portion, the closure means comprising: securing means attached to the lid portion for releasably securing the body and lid portions together to form a substantially gas-tight enclosure, the securing means permitting a limited degree of movement between the body and lid portions from a sealing position to a venting position when the pressure within the vessel exceeds the external pressure by a predetermined amount thereby permitting venting of excess pressure, the closure means comprising biasing means acting to bias movement of the body and lid portions from the venting position to the sealing position after venting of excess pressure.

The biasing means and the securing means may be constituted by the same component performing both functions. Alternatively, and preferably, the securing function and the biasing function are performed by discrete, but associated, securing and biasing components. Desirably the securing function is performed by a rigid securing component, so shaped and constructed as to protect the biasing component from damage, which might otherwise affect the operation of the biasing component. Desirably where the securing function and biasing function are performed by discrete components, both the securing and the biasing components will be attached to the lid portion.

In a second aspect the invention comprises a pressure vessel comprising a body portion and a lid portion and closure means, the closure means comprising: securing means attached to the lid portion for releasably securing the body and lid portions together to form a substantially gas-tight enclosure, the securing means permitting a limited degree of movement between the body and lid portions from a sealing position to a venting position when the pressure within the vessel exceeds the external pressure by a predetermined amount thereby permitting venting of excess pressure, the securing means acting to bias movement of the body and lid portions from the venting position to the sealing position after venting of excess pressure.

According to the invention, the securing means is attached to the lid portion of the pressure vessel, rather than the body portion as in the prior art. The arrangement of the invention has a number of advantages. The body portion, being free of moving parts, allows for greater ease of handling generally, particularly cleaning (and if required, autoclaving), and storage (the body portions of such vessels being readily stacked, one inside another).

Moreover, whilst the securing means is limited in that venting of the pressure vessel still occurs only when the pressure in the vessel exceeds the external pressure by a predetermined amount, a variety of different lids (with associated securing means of different detailed construction) may be provided for the same body portion, such that the same body portion can be adapted for use under a variety of conditions, with venting occurring at different pressure differentials. In contrast, with the prior art arrangements, in which the securing means is attached to the body portion, one body portion could only be used only to allow venting at one pressure differential. If venting at a different pressure differential was required, an entirely different body portion was required.

Advantageously, the closure means is manually operable. Typically the securing means is pivotally attached to the lid portion.

Desirably a plurality e.g. 4, of securing means are disposed around the outer surface of the pressure vessel. Typically, the pressure vessel is substantially cylindrical, with securing means regularly spaced around the circumference of the vessel.

Preferably the securing means comprises a clip which is adapted to engage a projecting surface of the body portion of the pressure vessel. Desirably an upward-turned bottom region of the clip engages a horizontal or downward-turned lip on the body portion. Preferably the clips comprise a synthetic polymeric material, such as acetal, or a metallic material, such as stainless steel. Desirably the securing means is constructed so as to provide a surface which facilitates manual movement of the securing means from an open and from a closed position. Preferably this surface is set at an angle such that it will project outwards from the pressure vessel and may be readily employed by a user whether the securing means is in the open or closed position.

The biasing means is conveniently in the form of a spring. The spring is advantageously made of stainless spring steel or similar metallic substance. Advantageously, the biasing means is associated at one end region with the securing means, and is associated at an opposed end region with the lid portion of the pressure vessel.

Preferably, movement of the securing means when securing the body and lid portions together exerts a force on the biasing means. In a preferred embodiment the force exerted tends to compress the biasing means. Advantageously, in securing the body and lid portions together the securing means passes through an equilibrium position such that, when secured the securing means is stably held in an"over-centre" closure against the side of the pressure vessel.

In one embodiment, the lid portion is provided with a plurality of pairs of projecting members, each member of a pair being connected to the other member of the pair by a rod. Each securing clip preferably comprises a similar rod. One end region of the biasing means is held in frictional engagement with the rod of the lid portion, the opposed end region of the biasing means being held by frictional engagement with the rod of the securing clip.

Preferably the arrangement is such that displacement of the lid portion from the sealing position to the venting position tends to place the biasing means under compression.

In use, increased pressure within the pressure vessel (e.g. due to heating of a pressure cooker, or activation of a gas generation system within an anaerobic jar) relative to the external pressure results in the creation of a pressure differential. If the internal pressure continues to rise, the pressure differential may become sufficient to overcome the bias provided, in part, by the securing means and thus to displace the lid portion from the sealing position to the venting position, which displacement permits venting of excess pressure, thereby reducing the internal pressure and reducing the pressure differential. Eventually the pressure differential is reduced to a level such that the bias provided by the biasing means serves to overcome the resistance provided by the pressure differential and returns the lid portion from the venting position to the sealing position, thereby again forming a substantially gas-tight enclosure.

The lid portion conveniently includes a hinged carrying handle which can be accommodated in a recess in lid when not required for use.

The lid portion advantageously includes a projecting surface which constitutes a finger grip to assist in removal of the lid portion from the body portion if there is a negative pressure within the vessel.

The vessel desirably incorporates manually operable valve means to permit introduction of air into a vessel to facilitate manual removal of the lid portion in the event that a negative pressure exists with the vessel which may hinder the separation of the lid portion from the body portion. The valve means is conveniently in the form a screw extending through the lid portion which can be turned to introduce air into the vessel.

The invention will now be further described by way of illustrative example and with reference to the drawings, in which.

DESCRIPTION OF THE EMBODIMENT

Described below is an anaerobic jar embodying the invention.

Figure 1:
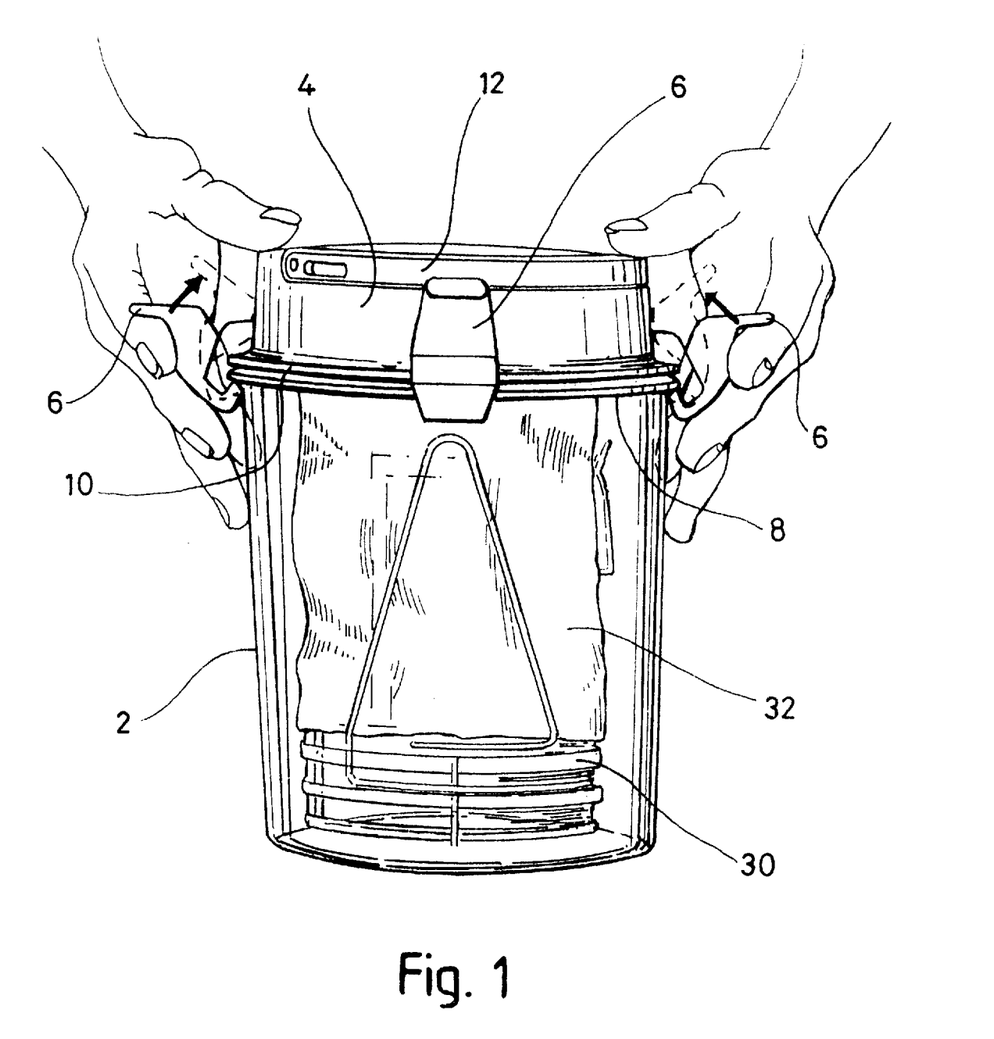
FIG. 1 shows a side elevation of an anaerobic jar embodying the invention.

Referring to FIG. 1, the anaerobic jar has a body portion 2 and a lid portion 4 which may be releasably secured together by four clips 6. The anaerobic jar has a volume of 2.5 litres.

The body portion 2 is substantially cylindrical (with a diameter of about 13 cm), but tapers slightly inwards towards the base. At the top, the body portion 2 has an outward-turned lip 8. The body portion 2 comprises a transparent synthetic plastics material.

The lid portion 4 retains a neoprene 0 ring gasket (28, FIG. 5) such that, when the body portion 2 and lid portions 4 are secured together a substantially gas-tight enclosure is formed.

The lid portion 4 is generally cylindrical with an outward turned lip 10 at its base. The lid portion 4 comprises an opaque synthetic plastics material, particularly acetal. A hinged carrying handle is provided which, when not in use, is locatable in a semi-circular recess in the circumference of the top edge of the lid portion.

The lid portion 4 is provided with 4 pairs of flanges (not shown in FIG. 1) projecting outward from the side thereof. A transverse rod is provided between the members of each pair. The rod has a diameter of 4 mm (26, FIG. 5).

Figure 2:
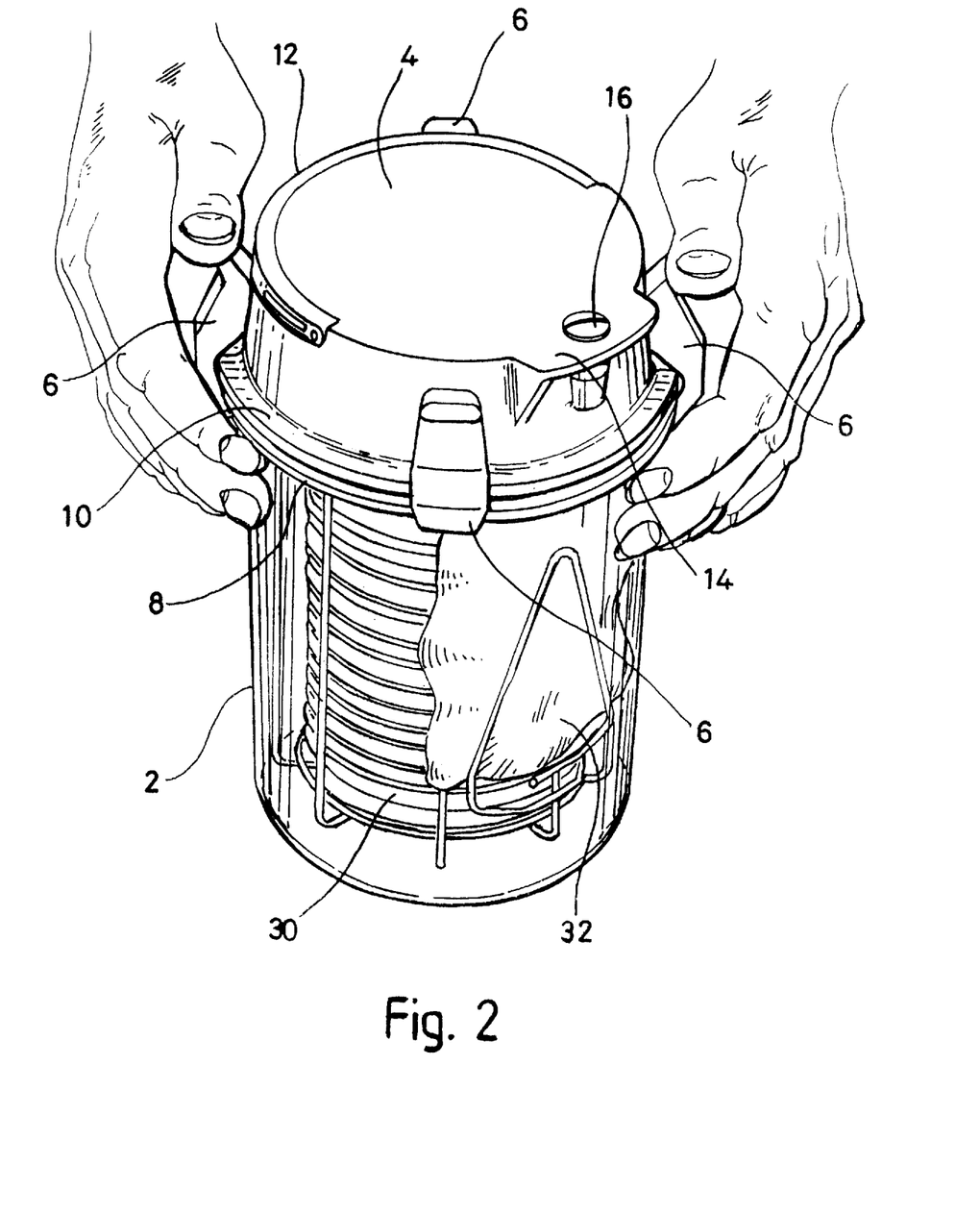
FIGS. 2 and 3 show a perspective view of the jar shown in FIG. 1, seen from above.
Figure 3:
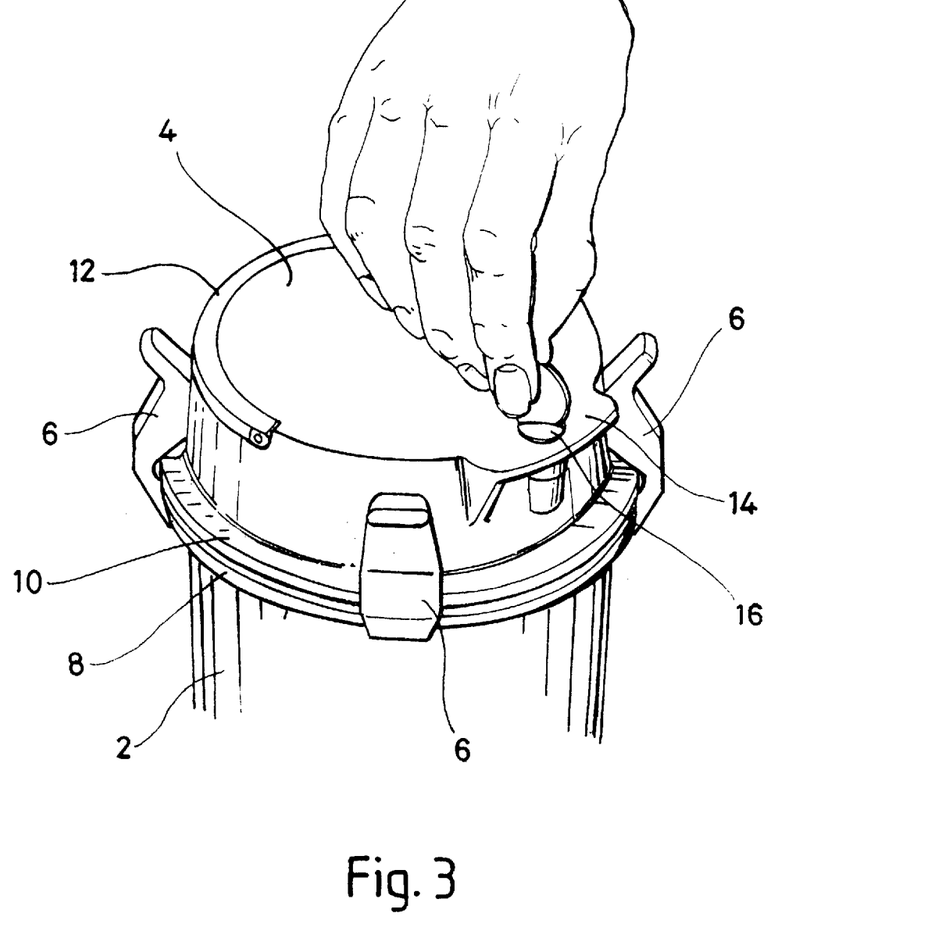
Figure 4:
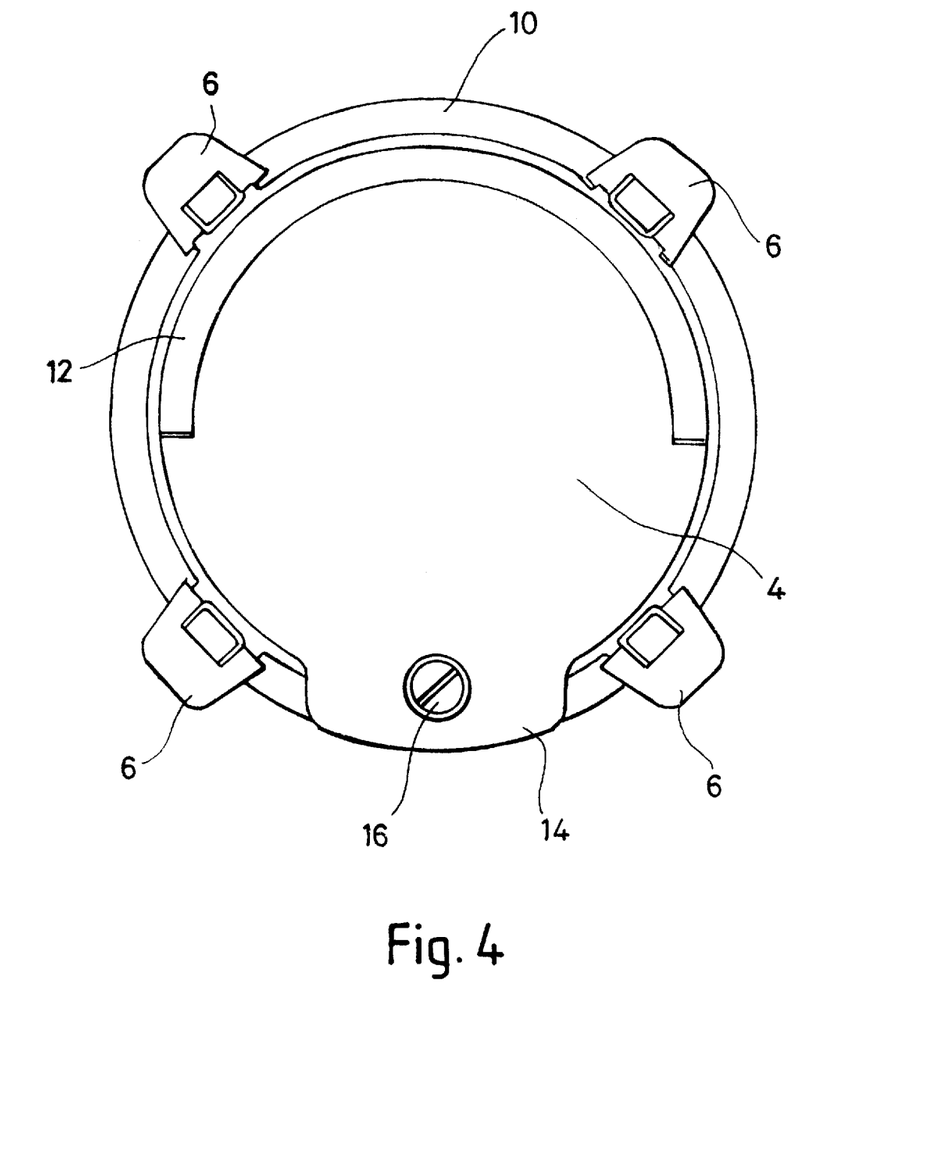
FIG. 4 is a plan view of the anaerobic jar depicted in FIGS. 1–3, but shown to a different scale (life size)

As can be seen in FIGS. 2, 3 and 4, the lid portion 4 is provided with a projecting surface 14 which constitutes a finger grip to assist in removal of the lid portion 4 from the body portion if there is a negative pressure in the vessel relative to the external pressure. In addition, the lid portion 4 also comprises a manually operable valve means to permit introduction of air into the anaerobic jar in the event that the negative pressure hinders separation of the lid portion 4 from the body portion 2, notwithstanding the finger grip. The valve means is in the form of a washer and a screw 16 extending through the lid portion 4, which screw 16 can be turned to introduce air into the vessel.

Figure 5:
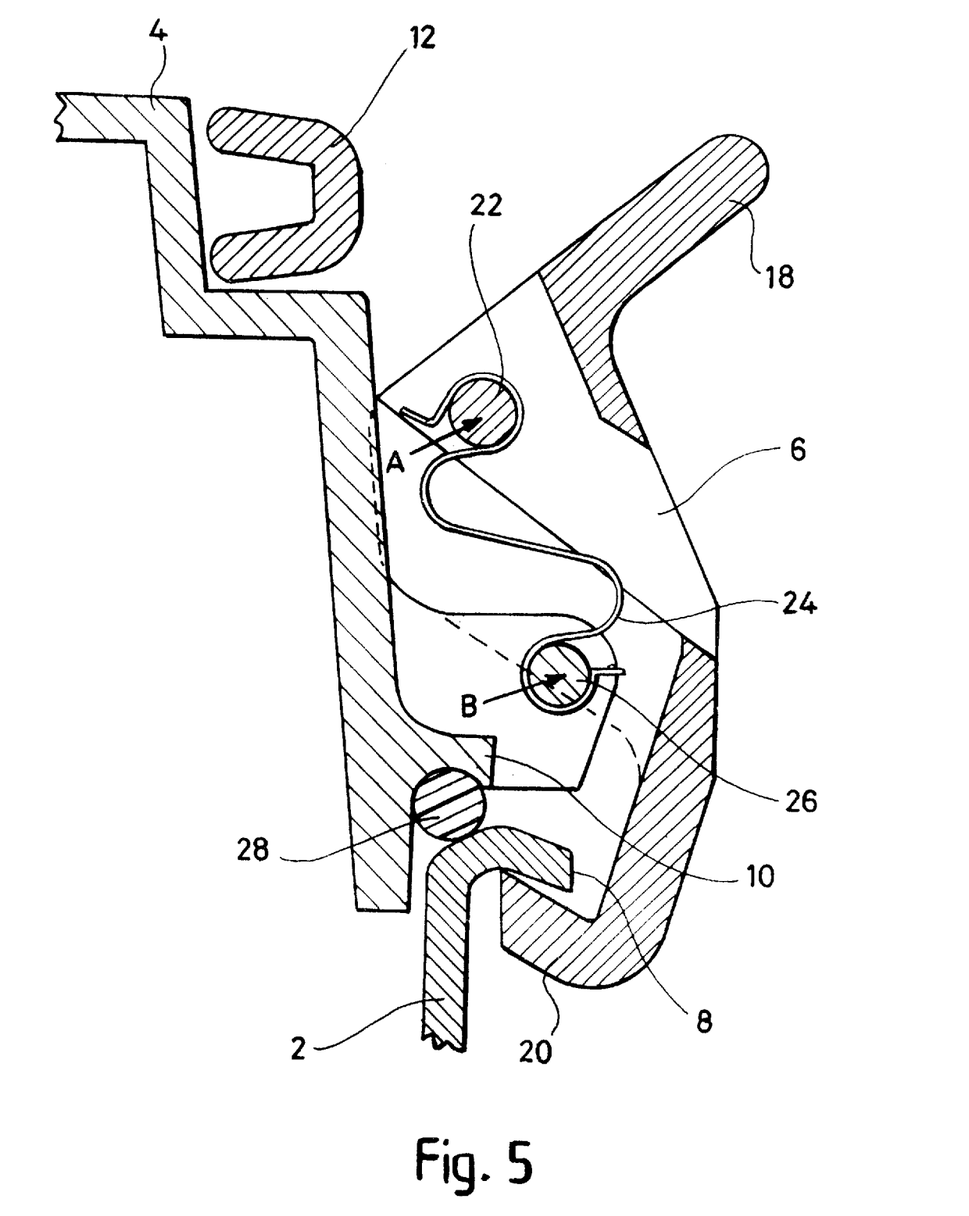
FIG. 5 is an enlarged cross-sectional view of the closure means of the anaerobic jar shown in FIGS. 1–4.
Figure 6:
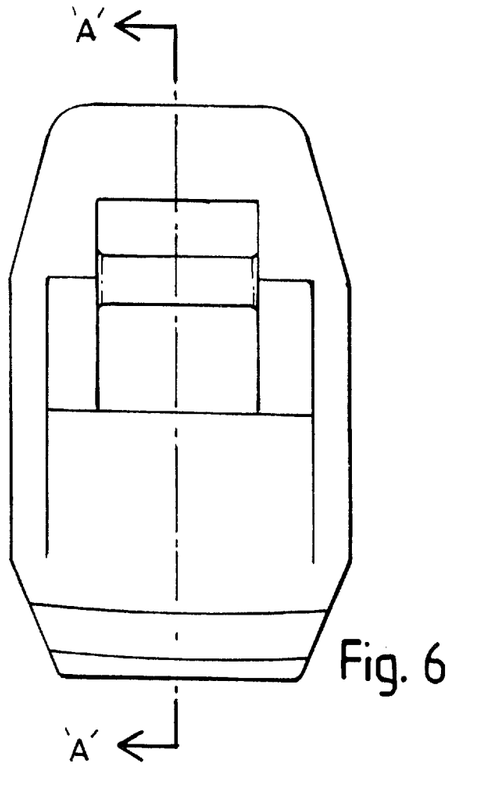
FIG. 6 is an enlarged front view of the clip shown in the previous Figures.
Figure 7:
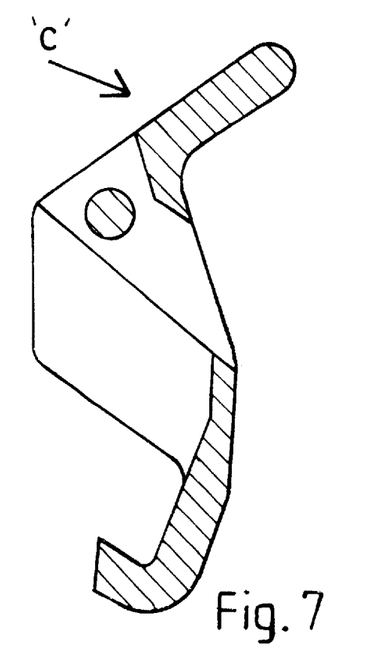
FIG. 7 is a view on the section A—A of FIG. 6.
Figure 8:
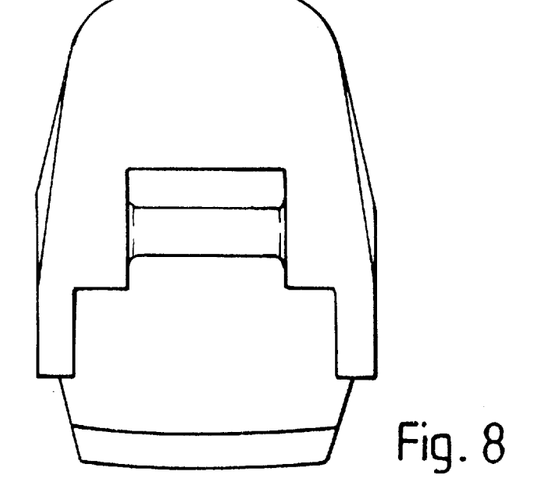
FIG. 8 is a view of the clip in the direction of arrow C shown in FIG. 7.

The four securing clips 6 are attached equidistantly around the circumference of the lid portion 4 and comprise acetal, a rigid moulded plastics material. Referring to FIG. 5, the clips 6 comprise an approximately S-shaped main portion with a finger grip 18 at the top and an inward-turned hook 20 at the bottom which fits under the outward-turned lip 8 of the body portion 2. The finger grip 18 provides a surface which facilitates manual movement of the clip 6 from both a closed position and from an open position. The surface of the finger grip 18 is set at an angle such that it projects outwards from the anaerobic jar and may be readily employed by a user, whatever the position of the clip. The clips 6 also comprise two side flanges with a transverse rod 22 located between them, the rod having a diameter of 4 mm.

Each clip 6 is also associated with discrete biasing means in the form of a spring 24 made of 28 s.w.g. stainless spring steel. The spring comprises a strip of generally flat metal formed into an approximate S-shape. One end of the spring 24 is bent around the transverse rod 22 of the clip 6. The opposed end of the spring 24 is bent around the transverse rod 26 of the lid portion 4. The rigid clip 6 helps protect the spring 24 against damage.

The springs permit a limited degree of movement between the body portion 2 and lid portion 4 from a sealing position to a venting position when the pressure within the vessel exceeds the external pressure by a predetermined amount, thereby permitting venting of excess pressure.

In use, inoculated Petri dishes (30, FIGS. 1 & 2) are stacked within the body portion 2, together with an appropriate gas generation system (32, FIGS. 1 & 2), such as are well known to those skilled in the art. The lid portion 4 is then placed on top of the body portion 2, with each clip 6 loose.

To seal the jar the four clips 6 are moved in the direction of the thick arrows shown in FIG. 1. Thus, with reference to FIG. 5, the clip 6 is rotated about the transverse rod 26, toward the lid portion 4 with the upward turned hook 20 of the clip 6 positioned under the lip 8 of the body portion 2 of the jar. The clip thus passes from an open position to a closed position and, in so doing, places the spring 24 under compression. In the open position, the length between points A and B shown in FIG. 5 is 17.5 mm. In the closed position the length A—B is reduced to 15 mm. This is found to exert a force of 10 lbs (+/−1lb). In the closed position, the clip 6 is securely held in an over-centre closure against the side of the lid portion 4. The upward-turned hook 20 of the clip 6 is engaged with the outward-turned lip 8 of the body portion 2.

This process is repeated for the other clips 6 with which the jar is equipped. When all the clips 6 are closed a substantially gas-tight seal is formed between the body portion 2 and the lid portion 4 by the neoprene o-ring gasket 28, the lid portion 4 being held in place by the compression of the springs 24 acting on the retaining clips 6.

The arrangement is such that, should the internal pressure exceed the external pressure by approximately 2 pounds per square inch (psi), the pressure differential will provide sufficient force to overcome the resistance of the springs 24 and will displace the lid portion 4 from the sealing position to the venting position, thereby breaking the air-tight seal. Displacement of the lid portion 4 causes further compression of the springs 24, as the clips 6 are held in place by their engagement with the lip 8 of the body portion 2 of the anaerobic jar.

The breaking of the air-tight seal allows gas to vent from the inside of the anaerobic jar, which reduces the pressure differential. Eventually the internal pressure falls to a point at which the compressed springs 24 exert a stronger force on the lid portion 4 than does the pressure differential and at this point the springs 24 will force the lid portion 4 back towards the sealing position. It is readily apparent that, should the internal pressure subsequently increase, resulting in a pressure differential above the threshold level of about 2 lb/psi, the process will be repeated.

The invention has been described above in relation to its application on an anaerobic jar. It will be appreciated by those skilled in the art that the invention can, in principle, be applied to any pressure vessel. Various factors can be altered to adapt the invention for use in different circumstances (e.g. use at different threshold pressure values). For example, to use the invention on pressure vessels which experience greater pressure differentials, the biasing means can be selected to provide more resistance. For instance, where springs are used they can be made of thicker and/or more rigid material. Alternatively, or in addition, movement of the clips into the locked position could provide a greater amount of compression of the springs, such that a higher pressure differential is needed to displace the lid part from the sealed position. Alternatively, if a system is required to operate at lower pressure differentials the reverse alterations could be made.

Accordingly, if desired, a number of different lids equipped with securing means and biasing means responsive to different pressure differentials may be provided for use with the same body portion, allowing the body portion to be used under a range of different conditions.

We claim:

1. Closure means for a pressure vessel, said pressure vessel comprising a body portion and a lid portion, the closure means comprising: securing means attached to the lid portion of the pressure vessel for releasably securing the body and lid portions together to form a substantially gastight enclosure, the securing means permitting a limited degree of movement between the body and lid portions from a sealing position to a venting position when the pressure within the vessel exceeds the external pressure by a predetermined amount thereby permitting venting of excess pressure, the closure means comprising biasing means acting to bias movement of the body and lid portions from the venting position to the sealing position after venting of excess pressure, said biasing means comprising a generally S-shaped spring wholly under compression in the sealing position and being further compressed on venting.

2. Closure means according to claim 1, wherein the securing means comprises a clip adapted to engage a projecting surface of the body portion of the pressure vessel.

3. Closure means according to claim 1, wherein securing the body and lid portions exerts a force on the biasing means.

4. Closure means according to claim 1, wherein the securing function and the biasing function are performed by discrete, but associated, securing and biasing components.

5. Closure means according to claim 1, wherein the biasing means comprises a spring of 28 standard wire gauge (s.w.g.) stainless spring steel.

6. Closure means according to any one of the preceding claim 1, wherein the securing means is provided with a surface which facilitates manual movement of the securing means from an open position and from a closed position.

7. Closure means according to claim 6, wherein the surface projects outwardly from the pressure vessel.

8. Closure means according to claim 1, wherein the biasing means comprises a generally S-shaped stainless steel wire spring.

9. Closure means according to claim 8 wherein the S-shaped wire spring has end portions which interconnect the spring between the lid portion and the clip.

10. An anaerobic jar comprising a body portion and a lid portion, securing means attached to the lid portion for releasably securing the body and lid portions together to form a substantially gas-tight enclosure, the securing means permitting a limited degree of movement between the body and lid portions from a sealing position to a venting position when internal pressure exceeds external pressure by a predetermined amount thereby permitting venting of excess pressure, and closure means comprising biasing means acting to bias movement of the body and lid portions from the venting position to the sealing position after venting of excess pressure, said biasing means comprising a generally S-shaped spring wholly under compression in the sealing position and being further compressed on venting.

11. An anaerobic jar according to claim 10, comprising equidistantly-located clips positioned circumferentially.

12. An anaerobic jar in accordance with claim 10 comprising a manually operable venting means for equalising pressure inside the anaerobic jar with the external pressure.

* * * * *